Nov. 17, 1931.  T. FORBY ET AL  1,832,374
BAKER'S APPARATUS
Filed June 20, 1927   4 Sheets-Sheet 1
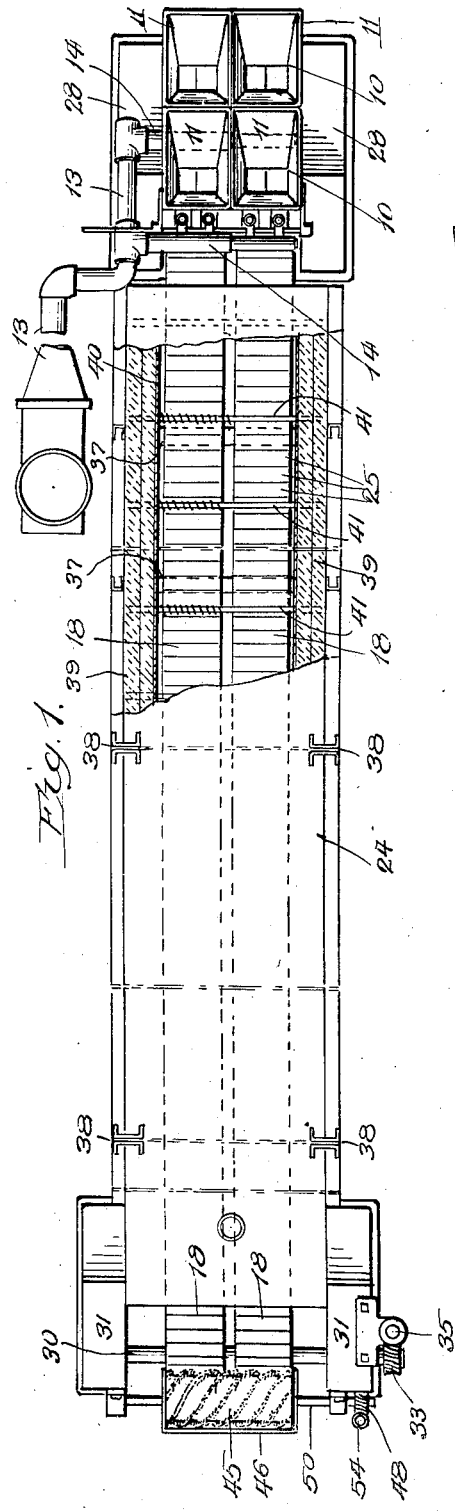
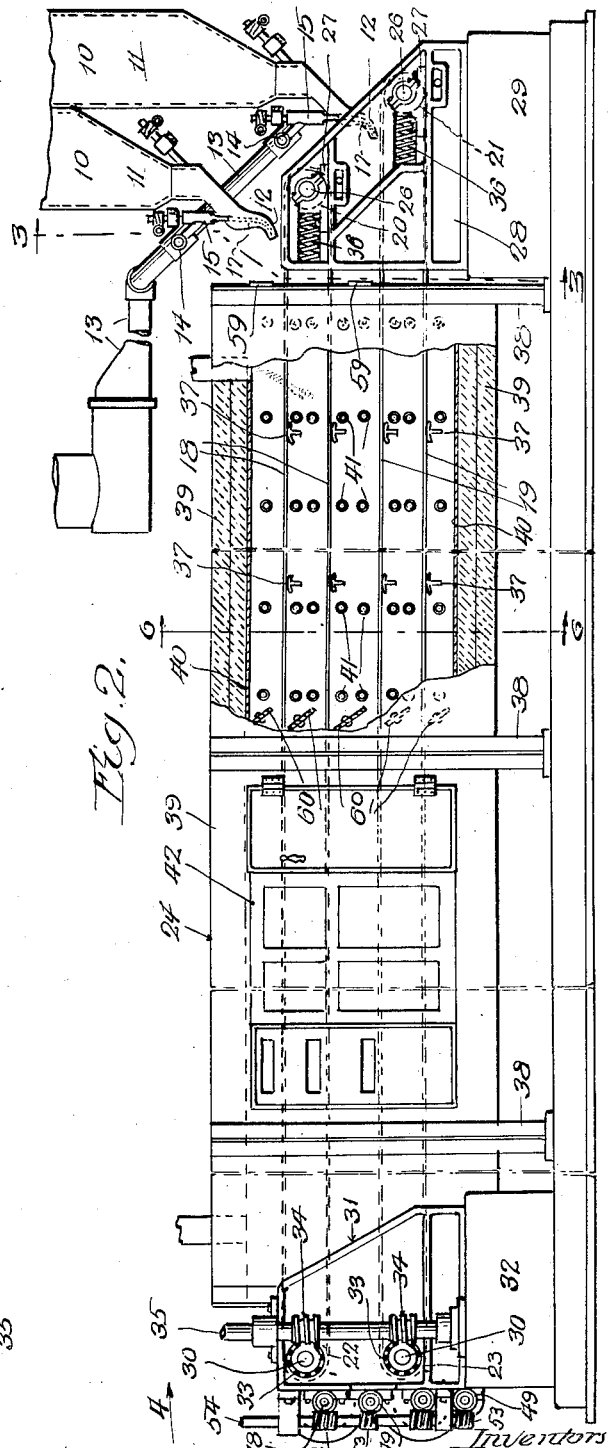

Nov. 17, 1931. T. FORBY ET AL 1,832,374
BAKER'S APPARATUS
Filed June 20, 1927 4 Sheets-Sheet 2
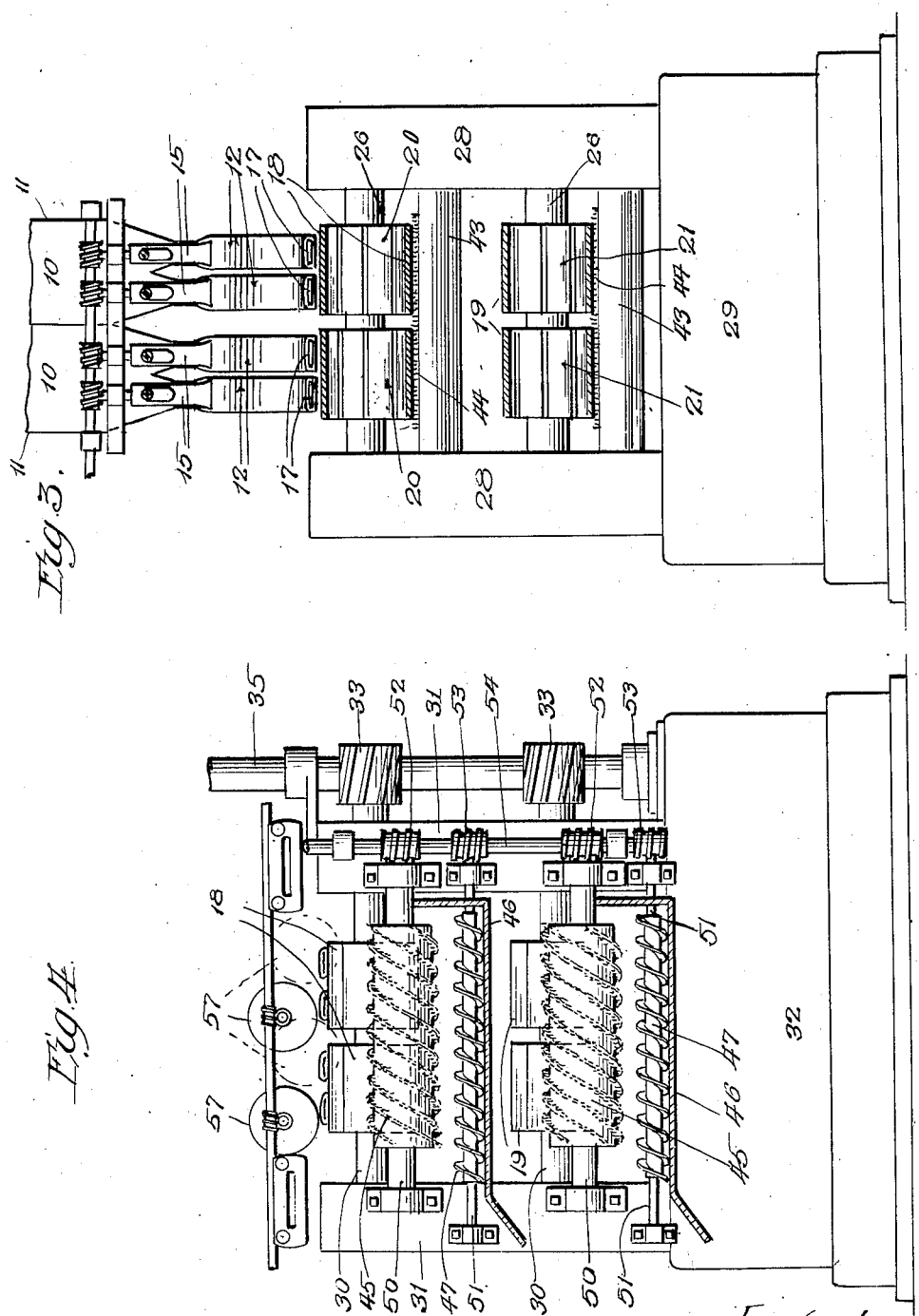

Nov. 17, 1931. T. FORBY ET AL 1,832,374
BAKER'S APPARATUS
Filed June 20, 1927 4 Sheets-Sheet 3
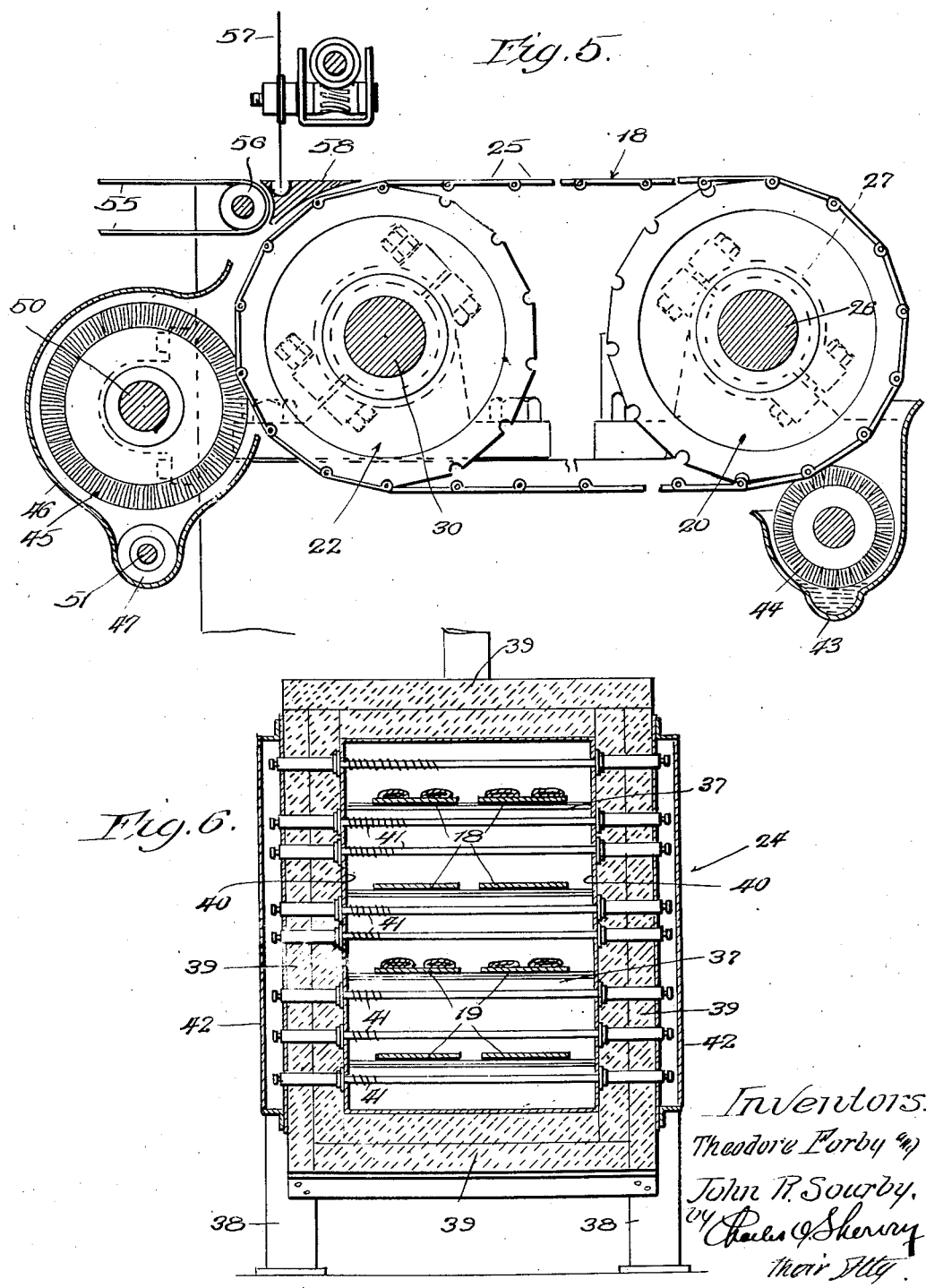

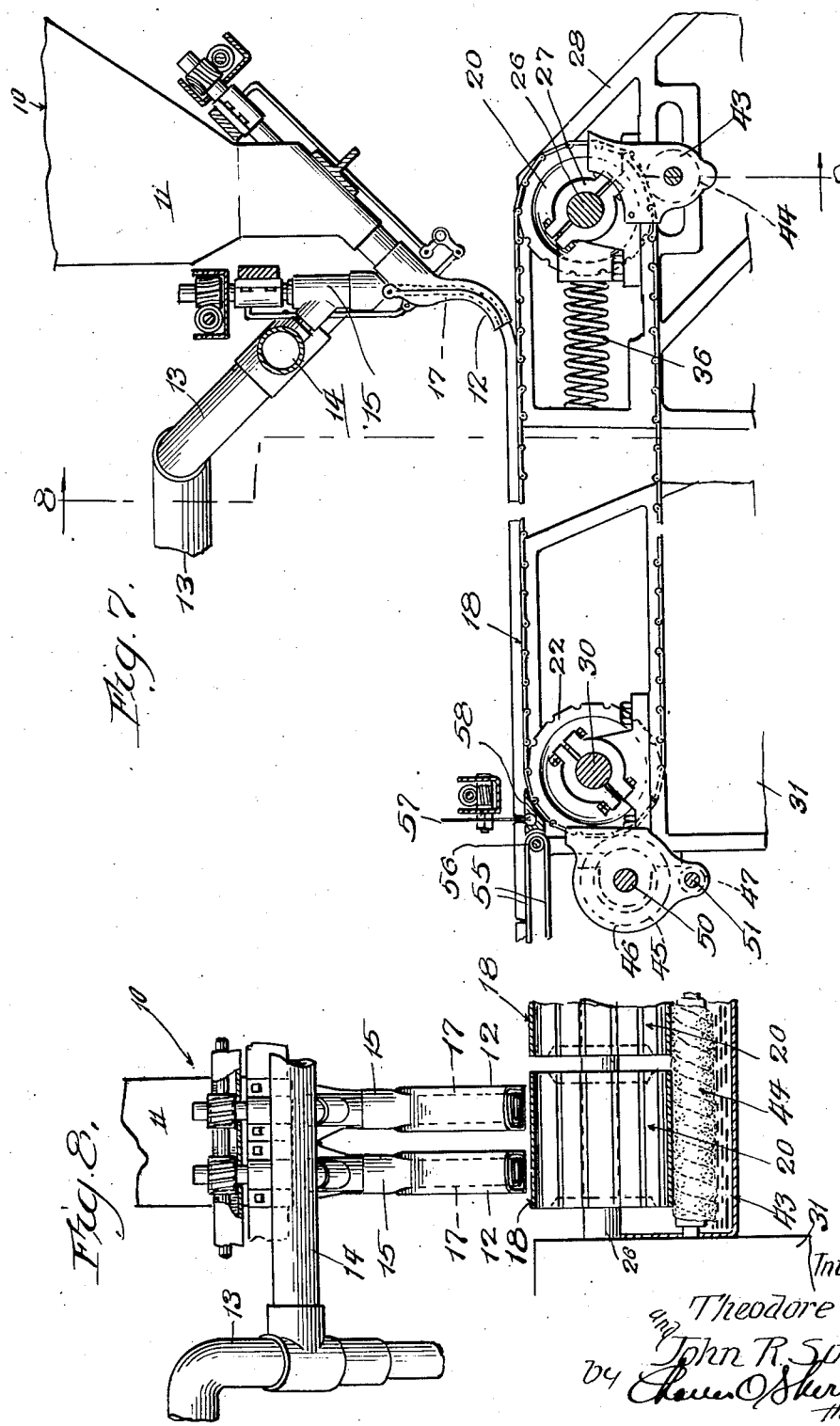

Patented Nov. 17, 1931

1,832,374

UNITED STATES PATENT OFFICE

THEODORE FORBY AND JOHN R. SOURBY, OF ZION, ILLINOIS

BAKER'S APPARATUS

Application filed June 20, 1927. Serial No. 199,974.

This invention relates to bakers' apparatus. The principal object of the present invention is to provide apparatus for use in carrying on a continuous operation of forming bakery material, pastry, confections and the like and baking them. Another object is to provide improved apparatus wherein the material may be baked in a minimum amount of time with apparatus occupying much less space than the usual baking apparatus for doing the same amount of work. Another object is to dispense with the usual bake pans. Another object is to provide a continuous or endless hot griddle for directly receiving the material to be baked and carrying the same through the oven to its discharge end. Another object is to provide means for controlling the heat in various sections of the oven.

With these and other objects and advantages in view, this invention consists in bakers' apparatus embodying mechanism for forming the material, and an oven associated therewith, having a continuous or endless, traveling hot griddle for directly receiving the material as it is formed, carrying it through the hot oven and discharging it when baked. The invention further consists in bakers' apparatus embodying a plurality of forming means, together with an associated baker's oven, employing a plurality of griddles and located one above the other and disposed in such manner that the formed material may be deposited upon the several hot griddles directly after it is formed, and conveyed through the oven and discharged when completely baked. The invention further consists in means for controlling the heat in the oven whereby the heat in different unit sections thereof may be regulated so as to produce different temperatures in different unit sections in the oven. The invention further consists in the several novel features of construction, arrangement and combination of parts hereinafter fully set forth and claimed.

The invention is clearly illustrated in the drawings accompanying this specification, in which:

Fig. 1 is a plan partly broken out of the bakers' apparatus embodying a simple form of the present invention; Fig. 2 is a side elevation thereof partly broken out; Fig. 3 is a detail, vertical, cross section taken on the line 3—3 of Fig. 2; Fig. 4 is a detail end view of the discharge end of the apparatus looking in the direction of the arrow 4 in Fig. 2; Fig. 5 is a detail, vertical, longitudinal section taken through the traveling griddle and drums around which it is trained and showing certain oiling and brushing mechanism for the traveling griddle; Fig. 6 is a detail, vertical, cross section taken on the line 6—6 of Fig. 2; Fig. 7 is a detail view, partly in side elevation and partly in longitudinal section, of the forming means, the endless, traveling, hot griddle, its supports, the oiler, the crumb brushing mechanism, and the cutting mechanism, and Fig. 8 is a detail cross section taken on line 8—8 of Fig. 7.

Referring to said drawings, which illustrate a simple embodiment of the present invention, the reference characters 10, 10 designate certain pastry or confection forming units which receive the dough and other material used in the formation of the bakery goods, pastry or confection, which is to be baked. Although any suitable form of forming mechanism may be employed in connection with the oven, the one shown has been chosen merely for the purpose of illustrating the invention. The type of forming apparatus shown is one for forming fig bars or other pastry material containing a filler of crushed figs, fruits or the like and an envelope therefor, composed of dough or other edible material and such an apparatus is more fully shown and described in our co-pending application on encasing machine, Serial No. 199,973, filed June 20, 1927. Briefly each unit embodies a hopper 11, for receiving the dough and having a discharge spout 12, through which the formed material is discharged. The crushed figs or other crushed fruit is conveyed to the apparatus by a main conduit 13, that has lateral branches 14, which deliver the crushed fruit into the filling cylinders 15, of the forming apparatus. The filling cylinders 15, terminate in discharge nozzles 17, which are contained within the discharge spouts 12, and are spaced away from the walls of the discharge spouts so as to leave a discharge passage for the dough which extends completely around the discharge passage for the crushed fruit. As in the apparatus of our co-pending application, spiral conveyors or other conveyors are contained in the forming apparatus for feeding the dough material and the crushed fruit through the discharge spout and discharging the formed material upon the hot traveling griddles of the oven as will be hereinafter fully set forth. Each forming unit may comprise a hopper and one or more discharge spouts as is illustrated in Figs. 3 and 8, and there may be as many units placed side by side as there are griddles in each tier in the oven and there may be as many rows of units as there are tiers of griddles in the oven. For the purpose of illustrating the invention, two endless traveling griddles are employed in each tier and there are two tiers of griddles, consequently each row of forming apparatus contains two units, and two rows of units are employed to make up the required number for feeding the material to the griddles.

The forming units are placed adjacent the receiving end of the oven as is clearly illustrated in Figs. 1, 2 and 7 and deposit the formed bakery goods, pastry or confections upon endless, traveling conveyors 18, 19, (see Figs. 1 and 2) which are trained around drums 20, 21, 22, 23 mounted adjacent the ends of the oven 24. Each endless conveyor is formed of hinged or linked together metal plates 25, (see Fig. 5) thus providing a continuous griddle that serves in place of the baker's pan for containing the material which is to be baked. The drums at the receiving end are mounted upon shafts 26, journaled in bearing boxes 27 mounted upon bearing brackets 28, which rest upon a suitable block or foundation member 29. The drums at the discharge end are mounted upon shafts 30, which are journaled in bearings carried by brackets 31, also mounted on a block or foundation member 32. Means are provided for driving the endless conveyors 18, 19 and the means shown, comprise worm gears 33 on the shafts 30 and meshing with worm gears 34, mounted on a drive shaft 35 journaled in suitable bearings and adapted to receive power from any suitable source. The bearing boxes 27 may be slidably mounted in the brackets 28 and may be provided with means for holding the endless conveyors taut, coiled compression springs 36 being illustrated in Figs. 2 and 7, behind the bearing boxes 27 for supplying the necessary tension to keep the endless conveyors taut. Supported within the oven, are transversely extending supports 37, which support the endless traveling conveyors within the oven.

The oven comprises a structure, composed of sectional units, arranged end to end and each composed of suitable structural iron work 38 and enclosing walls 39 formed of blocks of refractory material such as magnesia or other suitable composition best designed to retain the heat within the baking chamber of the oven. In Figs. 1 and 2 of the drawings, the length of the oven has been shortened considerably to enable the figures to be made as large as possible upon the sheet, and in actual practice the length of the oven is reduced considerably below that of the ordinary bake ovens now on the market for baking pastry material of the same general kind as that baked in the present oven. Any suitable heating apparatus is provided for supplying the necessary heat to properly heat the oven and traveling conveyor and to bake the food, and as a preference electric heating elements 41 are employed in the oven, and they are arranged above and below the several lengths of the endless traveling conveyors. The electric wiring or other control means for the heating apparatus may extend to suitable switches, valves or other control devices contained in metal cases or cabinets 42 located along the outer faces of the oven walls. Doors are provided in the cabinets for giving access to the interior thereof and inspection openings may be provided for viewing the interior of the oven. If desired, a metal or other lining 40 may be provided on the internal face of the oven walls. Curtain doors 59 may be provided at the ends of the oven and dampers 60 may be provided along the length of the oven thus forming sections, whereby any section may be substantially isolated from the other sections to maintain different temperatures in different sections, by closing the proper dampers.

At the receiving end of the oven, oiling means are provided for oiling the endless traveling griddles and as shown the oiling means may comprise reservoirs or receptacles 43, (see Fig. 5) one for each tier of griddles, and a rotary brush 44 contained in the receptacles or reservoirs and rotating in the oil contained therein. The brushes contact with the upper or supporting faces of the griddles and transfer oil thereto as they move past the brushes. Any suitable oil may be provided, as is well understood, for oiling or greasing the griddles. At the discharge end of the oven are rotary brushes 45, which contact with the griddles and are employed to brush away therefrom any crumbs that may collect thereon. The brushes 45 are contained in housings or casings 46 and in the lower portions of said housings are spiral conveyors 47, which convey the accumulated crumbs to one side of the apparatus and discharge them from the housings. Means are provided for rotating the brushes 45 and the spiral conveyors 47, and as shown said means may comprise worm gears 48, 49 (see Fig. 2) mounted on the shafts 50, 51 of the brushes and spiral conveyors respectively and meshing with worm gears 52, 53 (see also Fig. 4) that are mounted upon a shaft 54, which receives its power from any suitable source.

At the discharge end of the apparatus is a conveyor belt 55 (see Figs. 5 and 7) which is trained around a pulley 56 and serves to convey away the goods after they have been baked.

The goods may be deposited upon the griddles in the form of a long ribbon if desired and the ribbon baked as a whole during its passage through the bake oven, and with fig bars and other fruit bars it has been found desirable to leave the ribbon intact and bake the same as it passes through the oven and thereafter cut it into short bars. For the purpose of illustrating means for severing the ribbon into bars, revolving cutter discs 57 are illustrated in Figs. 4 and 5, which are power driven and may be provided with suitable mechanism (not shown) for bodily reciprocating them across the ribbons through a rectangular path. A cutting block 58 is illustrated in the notch between the drum 22 and roller 56 (see Fig. 5) over which the ribbons pass from the aprons or griddles to the conveyor belt 55 and said block is shown as formed with a depressed portion for receiving the revolving cutters or discs 57 as they cut through the material.

In the operation of the apparatus, the oven is heated and the pastry material is delivered to the hoppers 11 (see Figs. 1, 2 and 7) and to the conveyors 13 and fed to the discharge spouts and nozzle of the forming units, from which the material is delivered to the endless hot griddles in the form of ribbons. The oven having been heated to the proper temperature and the griddles having been set in motion, the mechanism of the forming units are started and the formed pastry ribbons are deposited upon the griddles. Inasmuch as the griddles are continuously passing through the hot oven they remain heated and are hot when the material is deposited thereon, consequently the material begins to be baked the moment it is deposited upon the hot griddles. As the griddles continue their movement through the bake oven, the pastry ribbons are carried through the oven and are thoroughly baked during the passage therethrough. They are severed into separate bars after being discharged from the oven and conveyed away for packing and storage. As the griddles pass over the oiling brushes 44, they are oiled preparatory to receiving the pastry, and after the baked pastry has been discharged from the griddles, the brushes 45 brush off any crumbs that remain on the griddles and the spiral conveyors 47 convey away and discharge said crumbs from the apparatus.

The material may be viewed through the inspection openings in the walls of the oven, and if the baker finds that the temperature in any section of the oven is too hot or not hot enough he may regulate the heat therein by using a more or less number of heating elements or he may close the dampers of any section or he may practically isolate a section from the other sections thereby maintaining one degree of heat in one section and different degrees of heat in other sections. It may be found desirable to apply a maximum temperature at the commencement of the baking operation or it may be found desirable to employ a minimum temperature at the receiving end of the oven, gradually increasing the temperature toward the discharge end. In any case, the temperature may be regulated by increasing or decreasing the number of heating elements used in any given section and isolating said section from the other sections by closing the dampers.

More or less variation of the exact details of construction is possible without departing from the spirit of this invention; we desire, therefore, not to limit ourselves to the exact form of the construction shown and described, but intend, in the following claims, to point out all of the invention disclosed herein.

We claim as new, and desire to secure by Letters Patent:

1. In bakers' apparatus, the combination with a plurality of forming units arranged in rows, one row behind the other, and each forming unit having at least one discharge spout, of an oven having a receiving end located adjacent said forming units, and a plurality of endless traveling heated griddles arranged in tiers in said oven and having receiving ends extending from said oven to positions underneath the discharge spouts of said forming units and receiving the formed material directly therefrom.

2. In bakers' apparatus, the combination with a plurality of forming units, arranged in rows, one row behind another, and each forming unit having at least one discharge spout, of an oven having a receiving end located adjacent said forming units, and a plurality of heated, endless, traveling griddles arranged in tiers in said oven, and having receiving ends projecting therefrom to positions under the forming units, said forming units depositing ribbons of formed material directly upon said heated griddles.

THEODORE FORBY.
JOHN R. SOURBY.